Figure 1:
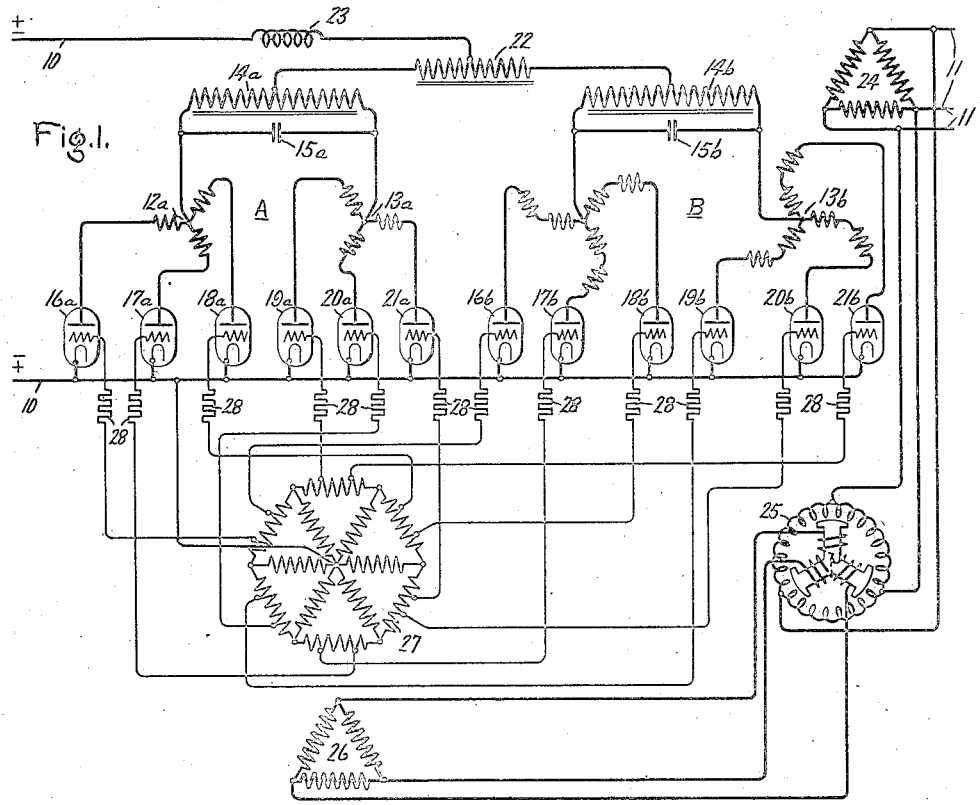

April 7, 1936.  C. H. WILLIS  2,036,843

ELECTRIC VALVE CONVERTING SYSTEM

Original Filed Dec. 22, 1931  2 Sheets-Sheet 1

Inventor:
Clodius H Willis;
by Charles V Mullen
His Attorney.

Patented Apr. 7, 1936

2,036,843

UNITED STATES PATENT OFFICE 2,036,843

ELECTRIC VALVE CONVERTING SYSTEM

Clodius H. Willis, Princeton, N. J., assignor to General Electric Company, a corporation of New York Application December 22, 1931, Serial No. 582,587
Renewed March 7, 1934

19 Claims. (Cl. 175—363)

My invention relates to electric valve converting systems, and more particularly to such systems including electric valves for transmitting energy between direct and alternating current circuits.

Heretofore there have been devised numerous apparatus including electric valves for transmitting energy between direct and alternating current circuits, or alternating current circuits of different frequencies, phases, or voltages. The use of vapor electric discharge valves in such apparatus has been found particularly advantageous because of the relatively large amounts of power which may be handled at ordinary operating voltages. On the other hand, the use of valves of this type has imposed certain power factor limitations upon the arrangements of the prior art because of the commutation requirements of this type of valve. It is well understood in the art that the grid of a vapor electric discharge valve of the type in common use at the present time is effective to control the starting of current in the valve, but that the current must be interrupted by a circuit external to the valve. In my copending applications, Serial Nos. 566,367 and 566,372, filed October 1, 1931, and in the copending application of C. A. Sabbah, Serial No. 566,378, filed October 1, 1931, all assigned to the same assignee as the present application, there are disclosed certain electric valve converting apparatus which are adapted to the requirements of valves of the vapor electric discharge type and which substantially eliminate the power factor limitations of such arrangements of the prior art. In these copending applications there are disclosed electric valve converting apparatus of the type including an inductive network, a plurality of electric valves, and means for introducing into the apparatus an alternating potential effective to commutate the current between the valves against the electromotive force of the inductive winding interconnecting the valves, which normally opposes such commutation under certain power factor conditions. My present invention constitutes an improvement upon the arrangements disclosed in the foregoing applications which disclose and broadly claim certain features described in the present application. In the arrangements of the prior art utilizing vapor electric discharge valves, also, the direct current entering or leaving the inductive network, that is, the axis of conduction, makes discrete jumps from valve to valve, which tends to establish an alternating current of stepped wave form in the alternating current circuit. This sudden transfer of current between the several valves has the additional disadvantages that the current has its maximum value at the instants of commutation so as to require a maximum commutating period and that the abrupt changes of current in the inductive circuits tend to produce current and potential transients which subject the valves and their associated control circuits to severe shocks. My invention relates more particularly to an electric valve converting system in which the axis of conduction of the inductive network has a uniform rotation.

It is an object of my invention, therefore, to provide an improved electric valve converting system for transmitting energy between direct and alternating current circuits which will overcome the above mentioned disadvantages of the arrangements of the prior art, and which will be simple and reliable in operation.

It is another object of my invention to provide an improved electric valve converting system including a polyphase inductive network for transmitting energy between direct and alternating current circuits in which the axis of conduction of the inductive network has a substantially uniform rotation.

It is a further object of my invention to provide an improved electric valve converting system for transmitting energy between direct and alternating current circuits in which the wave form of the alternating current will be substantially improved.

It is a still further object of my invention to provide an improved electric valve converting system for transmitting energy between direct and alternating current circuits in which a current of substantially sinusoidal wave form will be established on the alternating current circuit.

It is a still further object of my invention to provide an improved electric valve converting system for transmitting energy between direct and alternating current circuits in which power factor limitations on the alternating current circuit will be substantially eliminated and in which the commutation of the current between the several electric valves will be materially facilitated.

It is a still further object of my invention to provide an improved electric valve converting system which is particularly suitable for correcting the power factor of an alternating current system to which it is connected.

In accordance with one embodiment of my invention, direct and alternating current circuits are interconnected through a pair of electric valve converting apparatus which may be of any of the several types well known in the art, although I prefer to use apparatus of the type disclosed in the aforementioned applications, which substantially eliminate power factor limitations on the alternating current circuit. Each of the apparatus comprises a polyphase inductive network and a plurality of electric valves, the connections of each group of valves to its associated network being in staggered phase relation with respect to the connections of the valves of the other apparatus. If desired, a common inductive network may be used for both apparatus. Interposed in the connections between the two apparatus and the direct current circuit is a two-part inductive winding so connected that the two portions thereof have a cumulative magnetizing effect with respect to the alternating current component, with the result that the sum of the currents of the two apparatus is maintained substantially constant. The inductive winding is given sufficient reactance to somewhat retard the transfer of current between the two apparatus with the result that the load current is gradually transferred back and forth between the two apparatus, thus securing the equivalent of a continuously moving point of entrance in the inductive network. In accordance with one embodiment of my invention the connections are such that all of the electric valves have a common cathode potential, an arrangement which is particularly suitable for utilizing a single vapor electric device provided with a plurality of anodes. In accordance with another modification of my invention, a commutating circuit is connected across the two-part inductive winding to facilitate the transfer of current between the apparatus.

Figure 2:
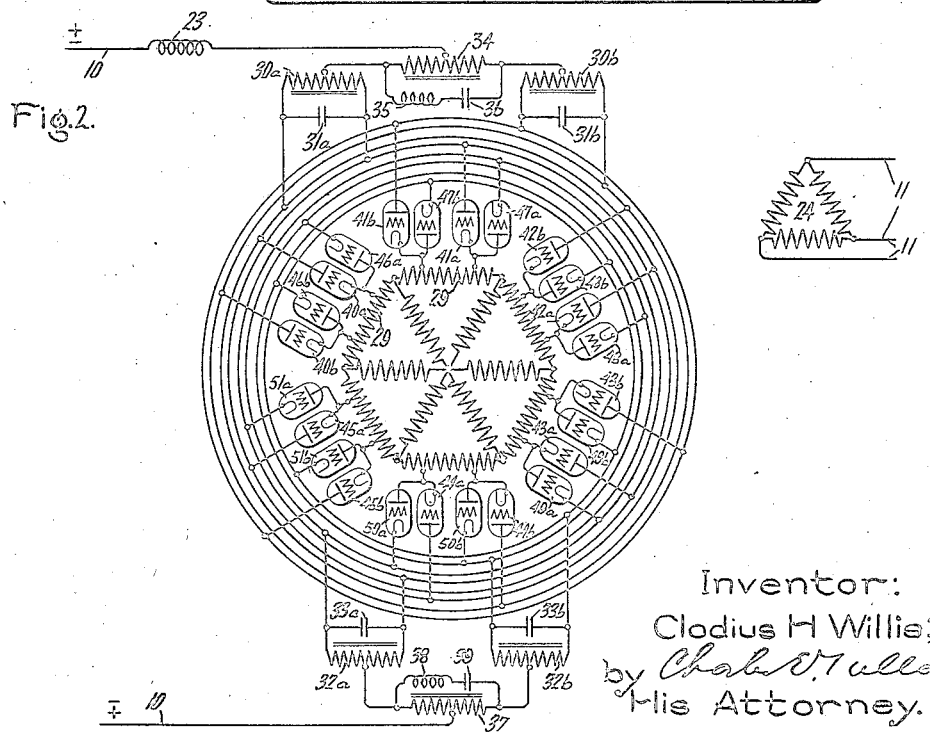
Figure 3:
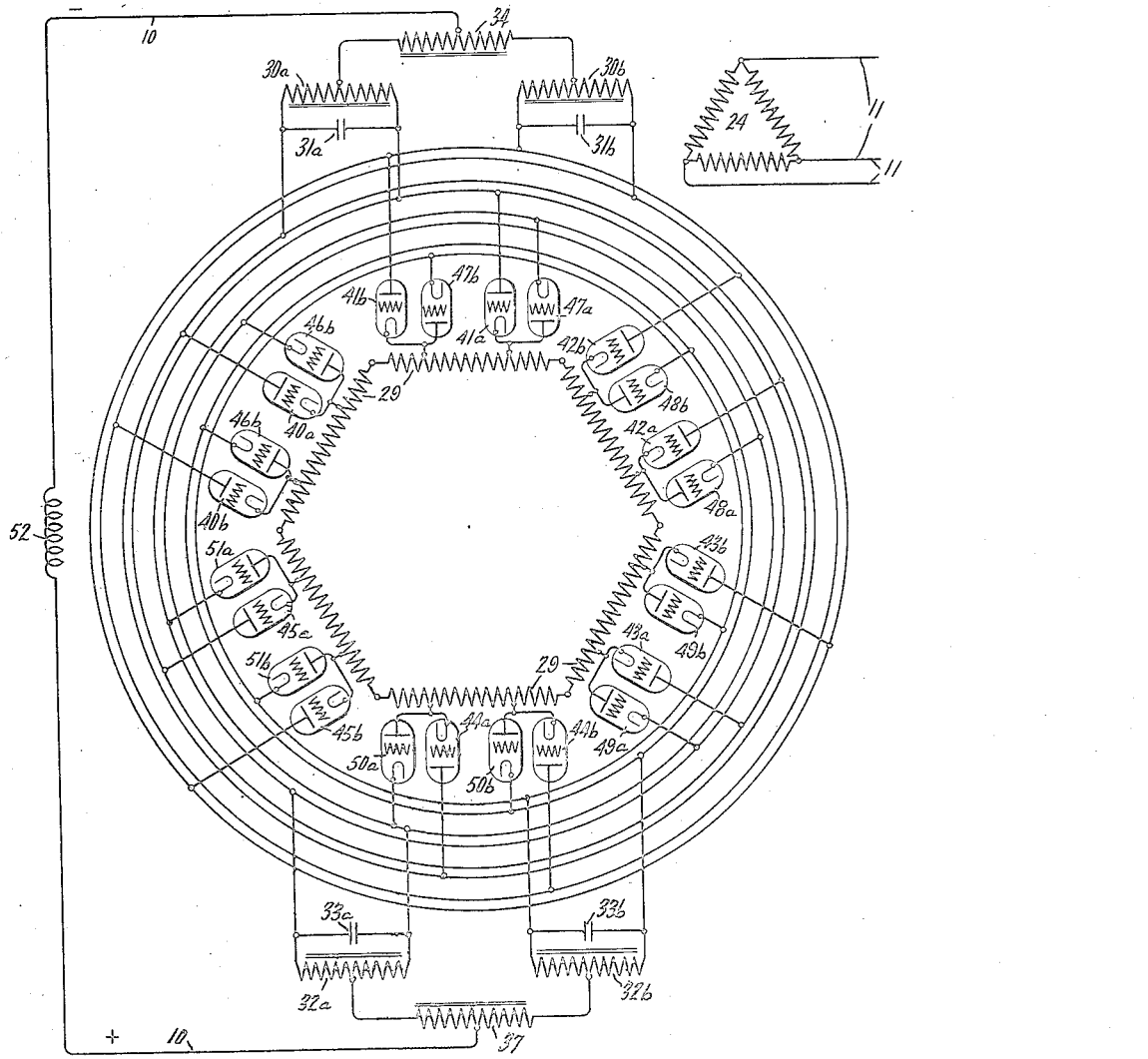

For a better understanding of my invention together with other and further objects thereof, reference is had to the following description taken in connection with the accompanying drawings, and its scope will be pointed out in the appended claims. In the drawings, Fig. 1 illustrates an embodiment of my invention for transmitting energy between a direct current circuit and a three-phase alternating current circuit in which a single phase alternating current circuit in which a single multiple anode vapor electric discharge device may be used; Fig. 2 illustrates a modification of my invention in which a single polyphase network is used for both valve converting apparatus and in which a commutating circuit is included across the load distributing inductive winding to facilitate the transfer of current between the apparatus; while Fig. 3 represents an application of my invention to a power factor correction system for a three-phase alternating current circuit.

Referring now to Fig. 1 of the drawings, there is illustrated a twelve phase half wave valve converting system for transmitting energy between a direct current circuit 10 and a three-phase alternating current circuit 11. This arrangement includes a pair of electric valve converting apparatus A and B, which may be of any of the several types well known in the art, although I prefer to use apparatus of the type disclosed in the aforementioned Sabbah application, Serial No. 566,378. Each of the apparatus A and B consists of a pair of three-phase inductive networks 12 and 13 provided with electrical neutrals connected to one side of the direct current circuit through opposite halves of a commutating winding 14 and with end terminals connected to the other side of the direct current circuit through electric valves 16–21, inclusive. The electric valves 16–21, inclusive, are each provided with an anode, a cathode, and a control grid and may be of any of the several types well known in the art, although I prefer to use valves of the vapor electric discharge type. The apparatus also includes a commutating capacitor 15 connected across the commutating winding 14. It will be noted in the drawings that corresponding numerals refer to corresponding elements in the two apparatus, the subscripts of the numerals referring to the apparatus of which the particular element is a part. As is well understood by those skilled in the art, the inductive networks 12 and 13 are displaced in phase substantially 60 electrical degrees so that the phase terminals of these two windings are in staggered phase relation. Similarly, the phase terminals of the networks 12a and 13a are displaced in phase with respect to the phase terminals of the networks 12b and 13b, so that the several phase terminals of the apparatus A and B are in staggered phase relation. One side of the direct current circuit 10 is interconnected with the electrical neutrals of the commutating windings 14a and 14b through opposite halves of an interphase inductive winding 22. It is desirable, also, to include a smoothing reactor 23 in the direct current circuit to maintain the direct current constant. The several networks 12 and 13 comprise one side of a polyphase transformer, the other side of which comprises the three-phase network 24, connected to the alternating current circuit 11. In order to control power factor conditions on the alternating current circuit and the relative voltages of the direct and alternating current circuits, the grids of the several electric valves are adapted to be excited from the alternating current circuit 11 through a three-phase rotary phase shifting transformer 25 and a grid transformer comprising a primary three-phase network 26 and a six-phase secondary network 27 provided with twelve symmetrically spaced terminals, giving the equivalent of a twelve-phase network. In case the alternating current circuit 11 is not connected to an independent source of electromotive force for determining its frequency, the grid transformer may be energized from any suitable source of control energy of the frequency which it is desired to supply to the circuit 11. If desired, current limiting resistors 28 may be included in the connections of the several phases of the network 27 to their respective control grids. In case valves of the vapor electric discharge type are employed, the grid transformer comprising the networks 26 and 27 should be self-saturating or self-saturating transformers should be interposed between the network 27 and the several grids, or some other means should be provided for converting the sinusoidal grid potential derived from the circuit 11 into one of peaked wave form, since the grid excitation of each electric valve should extend over a period somewhat less than 60 electrical degrees and preferably over only a very short interval. However, this feature of exciting the control grid of a vapor electric discharge valve with a periodic potential of peaked wave form forms no part of my present invention but is disclosed and broadly claimed in the copending application of B. D. Bedford, Serial No. 485,335, filed September 29, 1930, and assigned to the same assignee as the present application.

In explaining the operation of the above described apparatus it will be assumed that it is desired to transmit energy from the alternating current circuit 11 to the direct current circuit 10 under leading power factor conditions on the alternating current circuit 11, that the axis of maximum electromotive force of the several networks 12a, 13a, 12b, and 13b is vertical at the instant under consideration, with its upper end positive, and that the phase rotation is in a clockwise direction. It will also be assumed that, at the instant under consideration, the electric valve 16b connected to the network 12b is carrying substantially the full load current of the apparatus and that the current in the electric valve 19a connected to the network 13a has been reduced to substantially zero or to a very small value. Under these conditions, current has been flowing in electric valve 19a for 60 electrical degrees through the right hand portion of the commutating winding 14a, and, neglecting the magnetizing current of the winding 14a, this current has been balanced by an equal and opposite current flowing through the left hand portion of the winding 14a and the capacitor 15a. The result is that the capacitor 15a has become charged during this 60-degree interval to such a polarity that its left hand terminal is positive with respect to its right hand terminal. The electric valve 16b has been conducting for 30 electrical degrees and the current flowing through this valve and the commutating winding 14b has reduced the previously accumulated charge on the capacitor 15b to zero. When the electric valve 16a is made conductive, the potential of the capacitor 15a is effective to transfer the residual current in electric valve 19a to electric valve 16a against the resultant electromotive force of the phase windings interconnecting these valves. This commutation is effected substantially instantaneously. At the same time, the potential of the left-hand portion of the inductive winding 14a, which is half that of the capacitor 15a, is effective to commutate the current from electric valve 16b to electric valve 16a against the electromotive force of the phase windings interconnecting these valves. This commutating circuit, however, includes the inductive winding 22 which is designed with sufficient reactance to retard the commutation from the electric valve 16b to the electric valve 16a over an interval of approximately 30 electrical degrees, that is an interval equal to the time between the excitation of successive valves. During this 30-degree interval current builds up in electric valve 16a, flowing through the left-hand portion of the inductive winding 14a, and thus through the capacitor 15a, reducing the charge which has been accumulated on this capacitor to zero. At the same time, the current which is gradually decreasing in electric valve 16b flows through the left-hand portion of the commutating winding 14b and through the capacitor 15b charging it with such a polarity that its right-hand terminal is positive with respect to its left-hand terminal. At the end of this 30-degree interval, electric valve 19b is rendered conductive and the potential of the capacitor 15b is effective to commutate the residual current from the electric valve 16b to the electric valve 19b against the electromotive force of the phase windings interconnecting these valves. At the same time, the potential across the right-hand portion of the inductive winding 14b, which is half that of the capacitor 15b, is effective gradually to commutate the current from the electric valve 16a to the electric valve 19b through the reactance of the inductive winding 22, as described above. In this manner the current is successively commutated between the several electric valves throughout the complete cycle, the current gradually building up in one apparatus and dying down in the other apparatus, and one valve of each of the apparatus being conductive at any given instant. It will be noted that, with the above described arrangement, the only sudden transfer of current between the electric valves occurs when the valve current has been reduced to substantially zero, so that the commutation of the current is greatly facilitated and the shock to the valves and their associated apparatus due to current and potential transients is minimized. It was stated above that the reactance of the inductive winding 22 is sufficient to retard the transfer of current between the apparatus A and B over an interval of approximately 30 electrical degrees. Obviously, the time required for this commutation varies substantially proportionally to the magnitude of the current that is being commutated. On the other hand, the potentials supplied by the commutating capacitors 15a and 15b, which are effectively in series with the load current of the apparatus, also increase in direct proportion to the load current of the apparatus, and thus tend to decrease the time required for commutation. The resultant of these two factors is that the time required for commutation will be substantially independent of the magnitude of the current transmitted by the apparatus, and a proper value of reactance for the inductive winding 22 for a given load current will be also satisfactory for other values of load current.

As will be well understood by those skilled in the art, power factor conditions on the alternating current circuit 11 and the relative voltages of the direct and alternating current circuits may be regulated by adjusting the rotary phase shifting transformer 25. As described above and as explained in more detail in my copending applications above referred to, the apparatus may be operated under any power factor conditions between substantially zero power factor leading or lagging since the potentials across the capacitors 15a and 15b are effective to commutate the current between the several electric valves even when the electromotive force of the windings interconnecting these valves opposes such commutation. It will also be understood by those skilled in the art that energy may be transmitted through the apparatus in an opposite direction from that just described; that is, from the direct current circuit 10 to the alternating current circuit 11. The operation of the apparatus under such condition is substantially similar but the polarity of the direct current circuit is reversed. While I have shown, by way of example, an apparatus for transmitting energy to a three-phase alternating current circuit through the equivalent of a twelve-phase converter network, it will be understood that the invention is equally applicable to any other polyphase arrangement.

In Fig. 2 there is illustrated a twelve-phase full wave arrangement embodying my invention for transmitting energy between a direct current 10 and a three-phase alternating current circuit 11. As above, the reference numerals followed by subscript "a" indicate elements of one apparatus, while the same numerals followed by a subscript "b" refer to the corresponding elements of the other apparatus. In this arrangement a six-phase network 29, provided with twelve symmetrically spaced terminals, serves as the inductive winding for both electric valve converting apparatus. One apparatus comprises a commutating winding 30a provided with an electrical midpoint for connection to one side of the direct current circuit, and with end terminals each connected to alternate valves of the group 40a–45a, inclusive, which in turn are connected to alternate phase terminals of the network 29. A commutating capacitor 31a is connected across the winding 30a as in the arrangement of Fig. 1. This apparatus also includes the commutating winding 32a and associated commutating capacitor 33a similarly connected between the other side of the direct current circuit and a group of valves 46a–51a, inclusive, which are connected to the same terminals of the network 29 as the group 40a–45a but with opposite polarity. In this way, each terminal of the windings 30a and 32a is connected to every fourth phase terminal of the network 29. The other valve converting apparatus comprises the same elements indicated by the same reference numerals with the subscript b, the valves included in apparatus A and apparatus B being connected to staggered phase terminals of the winding 29. As in the arrangement of Fig. 1, the electrical midpoints of the commutating windings 30a and 30b are interconnected through a two-part inductive winding 34, the electrical midpoint of which is connected to one side of the direct current circuit. Similarly, the other side of the direct current circuit is connected to the windings 32a and 32b through the two-part reactor 37. In this modification a commutating circuit comprising a reactor 35 and a capacitor 36 is connected across the winding 34, the constants being so chosen that this circuit presents a reactance which in cooperation with the reactance of the inductive winding 34 and the reflected reactance of the associated alternating circuit produces commutation which will provide the desired characteristics or power factor. Similarly, a series circuit comprising a reactor 38 and capacitor 39 is connected across the inductive winding 37. The grid circuits have been omitted in Fig. 3 for the sake of clarity, but it will be understood that a grid control similar to that of Fig. 1 may be used.

The operation of the apparatus illustrated in Fig. 2 is in all respects similar to that described in connection with Fig. 1, one valve connected to the positive side of the direct current circuit and one valve connected to the negative side of the direct current circuit of each apparatus being conductive at any given instant. As in the arrangement of Fig. 1, the current is gradually transferred from one apparatus to the other and is commutated between the adjacent valves of each apparatus when it has been reduced to approximately zero. The function of the commutating circuits connected across the commutating reactors 34 and 37 is to maintain the current transfer between the two apparatus practically independent of the load at all power factors. The alternating current in the commutating circuits tends to build up to an infinite value, even under adverse power factor conditions. However, due to the unidirectional conductivity of the electric valves, it is impossible for this current to build up to a value greater than one half the load current, which corresponds to a complete transfer of load to one of the apparatus.

In my copending application, Serial No. 714,473, filed March 7, 1934, which is a continuation-in-part of this application, and which is assigned to the same assignee as the present application, there are disclosed and claimed the broader aspects of the commutating circuit which is connected across the two-part inductive winding.

The arrangement illustrated in Fig. 3 is identical with that of Fig. 2, with the exception that the resonant circuits across the commutating windings are omitted and the direct current circuit 10 is short-circuited through a reactor 52. As in the arrangement of Fig. 2 the grid circuits have been omitted for the sake of simplicity, although it will be obvious that each electric valve will be excited in its normal phase sequence. By displacing the phase of the grid potentials substantially 90 degrees with respect to the anode potentials of the several electric valves, the apparatus will draw a substantially wattless sinusoidal current from the alternating current circuit 11, either leading or lagging in accordance with whether the grid potentials are leading or lagging their anode potentials, and will thus be effective to correct the power factor on the alternating current circuit 11. By this type of operation it is seen that, by displacing the phase of the grid potentials a very few degrees from quadrature, a small unidirectional potential will appear in the circuit 10 and this potential is completely consumed by the impedance drop of the circulating current flowing through the apparatus. Under these conditions, therefore, the shift in phase of the grid potential from quadrature is limited to a relatively small angle, for, if the grid potentials even approach phase coincidence with the anode potentials, destructive circulating currents would be set up in the apparatus. Within the narrow range of control near quadrature the magnitude of the wattless current circulating through the apparatus, either leading or lagging, is substantially proportional to the angular displacement of the grid potentials from quadrature and this is true throughout substantially the full range of power factor correction on the alternating current circuit 11. This type of operation is to be distinguished from the ordinary phase control of the grids of an electric valve converting apparatus interconnecting alternating and direct current power circuits in which the variation of the power factor on the alternating current circuit is dependent upon and incidental to the variation of the average voltage on the direct current circuit; that is, the energy transmitted between the two circuits.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric valve converting system comprising a direct current circuit, an alternating current circuit, a pair of electric valve converting apparatus interconnecting said circuits, each comprising a polyphase inductive network and a plurality of electric valves, means for alternately rendering conductive successive valves of said pair of converting apparatus, and an inductive winding interconnecting said apparatus with said direct current circuit and having a reactance of such value as to retard the transfer of current between said apparatus sufficiently for producing a uniform rotation of the axis of conduction of said networks.

2. An electric valve converting system comprising a direct current circuit, an alternating current circuit, a pair of electric valve converting apparatus interconnecting said circuits, each comprising a polyphase inductive network and a plurality of electric valves, means for alternately rendering conductive successive valves of said pair of converting apparatus, means for introducing into the connections between said pair of converting apparatus a potential effective to periodically transfer the current between said apparatus, and an inductive winding interconnecting said apparatus with said direct current circuit and having such a reactance as to retard the transfer of current between said apparatus over a period substantially equal to the time displacement between the conductive cycles of sequentially adjacent valves for establishing a substantially sinusoidal current in said alternating current circuit.

3. An electric valve converting system comprising a direct current circuit, an alternating current circuit, a pair of electric valve converting apparatus interconnecting said circuits each comprising a polyphase inductive network and a plurality of electric valves, the valves of each of said apparatus being connected to symmetrically spaced phase-terminals of their associated network, the connections of the valves of said groups being in staggered phase relation, means for alternately rendering conductive successive valves of said pair of converting apparatus, and an inductive winding interconnecting said apparatus with said direct current circuit and having such a reactance as to retard the transfer of current between said apparatus over a period substantially equal to the time displacement between the conductive cycles of sequentially adjacent valves for establishing a substantially sinusoidal current in said alternating current circuit.

4. An electric valve converting system comprising a direct current circuit, an alternating current circuit, a pair of electric valve converting apparatus interconnecting said circuits, each apparatus comprising a polyphase inductive network and a plurality of electric valves, means for alternately rendering conductive successive valves of said pair of converting apparatus, means for introducing into said apparatus an alternating potential to commutate the current between the valves of each apparatus against the electromotive force of said network under any desired power factor conditions on said alternating current circuit and to periodically transfer the current between said apparatus, and an inductive winding interconnecting said apparatus with said direct current circuit and having a substantial reactance for retarding the transfer of the load current between said apparatus.

5. An electric valve converting system comprising a direct current circuit, an alternating current circuit, a pair of electric valve converting apparatus interconnecting said circuits, each apparatus comprising a polyphase inductive network, a plurality of electric valves and an independent commutating winding, means for alternately rendering conductive successive valves of said pair of converting apparatus, and means for producing in said commutating winding an alternating potential to commutate the current between the valves of each apparatus against the electromotive force of said network under any desired power factor conditions on said alternating current circuit and to periodically transfer the current between said apparatus, and an inductive winding interconnecting said commutating windings with one side of said direct current circuit and having a substantial reactance for retarding the transfer of the load current between said apparatus.

6. An electric valve converting system comprising a direct current circuit, an alternating current circuit, a pair of electric valve converting apparatus interconnecting said circuits, each apparatus comprising a polyphase inductive network, a plurality of electric valves, an independent commutating winding provided with an electrical midpoint, and means for producing in said commutating winding an alternating potential to commutate the current between said valves against the electromotive force of said network under any desired power factor conditions on said alternating current circuit, and a two part inductive winding provided with an electrical midpoint, the midpoint of said last mentioned winding being connected to one side of said direct current circuit and the end terminals of said winding being connected to the electrical midpoints of said commutating windings.

7. An electric valve converting system comprising a direct current circuit, an alternating current circuit, a pair of electric valve converting apparatus interconnecting said circuits, each comprising a polyphase inductive network, a plurality of electric valves each provided with an anode, a cathode, and a control grid, means for impressing upon each control grid an alternating potential variable in phase with respect to its anode potential to control the power factor conditions on the alternating current circuit, and means for introducing into said apparatus an alternating potential variable in phase in accordance with the phase of the valve currents to commutate the current between the valves of each apparatus against the electromotive force of said network under any desired power factor conditions on said alternating current circuit and for periodically transferring the current between said apparatus, and an inductive winding interconnecting said apparatus with said direct current circuit and having a substantial reactance for retarding the transfer of the load current between said apparatus.

8. An electric valve converting system comprising a direct current circuit, an alternating current circuit, a pair of electric valve converting apparatus interconnecting said circuits, each comprising a polyphase network and a plurality of electric valves, the phase terminals of the networks of the two apparatus being in staggered phase relation, means for introducing into the connections between said pair of converting apparatus a potential effective to periodically transfer the current between said apparatus, and an inductive winding interconnecting said apparatus with said direct current circuit and having a substantial reactance for retarding the transfer of the load current between said apparatus.

9. An electric valve converting system comprising a direct current circuit, an alternating current circuit, a pair of half wave electric valve converting apparatus interconnecting said circuits, each comprising a pair of polyphase inductive networks provided with electrical neutrals and phase terminals in staggered phase relation, a plurality of electric valves interconnecting the several phase terminals with one side of the direct current circuit, a commutating winding interconnecting the electrical neutrals of said networks, and means for producing in said commutating winding an alternating potential for commutating the current between valves associated with different networks against the electromotive force of said networks under any desired power factor conditions on said alternating current circuit, and a two part inductive winding provided with an electrical midpoint connected to the other side of said direct current circuit and end terminals connected to the midpoints of said commutating windings for effecting a gradual transfer of the load current between said apparatus.

10. An electric valve converting system comprising a direct current circuit, an alternating current circuit, a pair of electric valve converting apparatus interconnecting said circuits, each comprising a polyphase inductive network and a plurality of electric valves, and means for effecting a gradual transfer of the load current between said apparatus comprising means for introducing into the connections between said pair of converting apparatus a potential effective to periodically transfer the current between said apparatus, an inductive winding interconnecting said apparatus with said direct current circuit and provided with substantial reactance, and a commutating circuit connected across said inductive winding.

11. An electric valve converting system comprising a direct current circuit, an alternating current circuit, a pair of electric valve converting apparatus interconnecting said circuits, each comprising a polyphase inductive network and a plurality of electric valves, and means for effecting a gradual transfer of the load current between said apparatus comprising means for introducing into the connections between said pair of converting apparatus a potential effective to periodically transfer the current between said apparatus, an inductive winding interconnecting said apparatus with said direct current circuit, and provided with substantial reactance, and a reactor and a capacitor serially connected across said inductive winding, said reactor and capacitor operating to change the frequency at which said inductive winding normally operates.

12. An electric valve converting system for correcting the power factor of a polyphase alternating current circuit comprising a pair of electric valve rectifiers each comprising a polyphase inductive network and a plurality of electric valves, said rectifiers having a common direct current circuit, a reactor connected to short-circuit said direct current circuit, means for introducing into the connections between said pair of converting apparatus a potential effective to periodically transfer the current between said apparatus, and an inductive winding interposed in the connections from said rectifiers to said direct current circuit for retarding the transfer of load current between said rectifiers.

13. An electric valve converting system comprising an alternating current circuit, and means for drawing from said circuit a substantially sinusoidal zero power factor current comprising a pair of electric valve rectifiers each including a polyphase inductive network and a plurality of electric valves, said rectifiers having a common direct current circuit, a reactor connected to short-circuit said direct current circuit, and a two part inductive winding provided with an electrical midpoint connected to one side of said direct current circuit and with end terminals connected one to each rectifier.

14. An electric valve converting system comprising a direct current circuit, an alternating current circuit, a pair of electric valve converting apparatus interconnecting said circuits, each of said converting apparatus comprising a polyphase inductive network and a plurality of electric valves, means for alternately transferring the current between successive valves of said pair of converting apparatus including an inductive winding interconnecting said apparatus with said direct current circuit whereby a uniform rotation of the axis of conduction of said networks is effected.

15. An electric valve converting system comprising a direct current circuit, an alternating current circuit, a pair of electric valve converting apparatus interconnecting said circuits each comprising a polyphase inductive network and a plurality of electric valves, and means for alternately transferring current between successive valves of said pair of apparatus including a commutating circuit connected between said apparatus and said direct current circuit for introducing between said pair of converting apparatus a potential effective to periodically transfer the current between said apparatus whereby but one electric valve in each apparatus is conductive at any instant.

16. An electric valve converting system comprising a direct current circuit, an alternating current circuit, a pair of electric valve converting apparatus interconnecting said circuits, each comprising a polyphase inductive network and a plurality of electric valves, means for alternately rendering conductive successive valves of said pair of converting apparatus, and an inductive winding interconnecting said apparatus with said direct current circuit and having substantial reactance to retard the transfer of current between said apparatus for effecting a uniform rotation of the axis of conduction of said network.

17. An electric valve converting system comprising a direct current circuit, an alternating current circuit, a pair of electric valve converting apparatus interconnecting said circuits, each comprising a polyphase inductive network and a plurality of electric valves, means for alternately rendering conductive successive valves of said pair of converting apparatus, means for introducing into the connections between said pair of converting apparatus a potential effective to periodically transfer the current between said apparatus, and an inductive winding interconnecting said apparatus with said direct current circuit and having such reactance as to retard the transfer of current between said apparatus over a period substantially equal to the time displacement between the conductive cycles of sequentially adjacent valves for establishing a substantially sinusoidal current in said alternating current circuit.

18. An electric valve converting system comprising a direct current circuit, an alternating current circuit, a pair of electric valve converting apparatus interconnecting said circuits and each comprising a plurality of electric valves, a commutating circuit for each apparatus for alternately transferring current between successive valves of each apparatus comprising an inductor and a capacitor, and means including an inductive winding connected between said commutating circuit and said direct current circuit, said inductive winding having a reactance so related to the capacitive reactance of said commutating circuit as to introduce between said electric valve apparatus a potential effective periodically to transfer gradually the current between said apparatus whereby but one electric valve in each apparatus is conductive at any instant.

19. An electric valve converting system comprising a direct current circuit, an alternating current circuit, a pair of electric valve converting apparatus inter-connecting said circuits, a common polyphase inductive network for said apparatus, each apparatus including also a group of electric valves, the groups of valves being connected to said network in staggered phase relation, and an inductive winding interconnecting said apparatus with said direct current circuit and having a reactance of such value as to effect a gradual transfer of substantially the entire load current between said apparatus.

CLODIUS H. WILLIS.